United States Patent
Chi-Hsueh

(10) Patent No.: US 9,834,085 B2
(45) Date of Patent: Dec. 5, 2017

(54) DISC-TYPE DYNAMIC MOTOR

(71) Applicant: Richard Chi-Hsueh, San Jose, CA (US)

(72) Inventor: Richard Chi-Hsueh, San Jose, CA (US)

(*) Notice: Subject to any disclaimer, the term of this patent is extended or adjusted under 35 U.S.C. 154(b) by 0 days.

(21) Appl. No.: 15/212,499

(22) Filed: Jul. 18, 2016

(65) Prior Publication Data

US 2016/0325617 A1 Nov. 10, 2016

Related U.S. Application Data

(62) Division of application No. 14/613,474, filed on Feb. 4, 2015, now Pat. No. 9,738,150.

(60) Provisional application No. 61/966,195, filed on Feb. 18, 2014.

(51) Int. Cl.
*H02K 1/27* (2006.01)
*B60K 7/00* (2006.01)
*B60K 6/46* (2007.10)
*B60K 17/356* (2006.01)

(52) U.S. Cl.
CPC .............. *B60K 7/0007* (2013.01); *B60K 6/46* (2013.01); *B60K 17/356* (2013.01); *H02K 1/2793* (2013.01); *B60K 2007/0038* (2013.01); *B60K 2007/0092* (2013.01); *B60Y 2200/92* (2013.01); *B60Y 2400/114* (2013.01); *Y10S 903/906* (2013.01)

(58) Field of Classification Search
CPC ...... B60K 6/46; B60K 7/0007; B60K 17/356; H02K 1/2793

USPC .......................................................... 310/268
See application file for complete search history.

(56) References Cited

U.S. PATENT DOCUMENTS

| | | | | |
|---|---|---|---|---|
| 5,334,899 A | * | 8/1994 | Skybyk | H02K 1/2793 310/114 |
| 2002/0145351 A1 | * | 10/2002 | Horng | F04D 25/0653 310/114 |
| 2005/0179337 A1 | * | 8/2005 | Hasebe | H02K 1/2793 310/268 |
| 2006/0033393 A1 | * | 2/2006 | Ritchey | H02K 7/108 310/112 |
| 2008/0088200 A1 | * | 4/2008 | Ritchey | H02K 16/00 310/268 |

* cited by examiner

*Primary Examiner* — Naishadh Desai
(74) *Attorney, Agent, or Firm* — Rosenberg, Klein & Lee

(57) ABSTRACT

An energy efficient vehicle and a disc-type dynamic motor thereof are disclosed. The vehicle comprises front wheels and rear wheels, and a gasoline engine is assembled in the vehicle for driving a generator producing power. The power is transported to a capacitor battery via a circuit control system and then to disc-type dynamic motors, which are assembled with the rear wheels, from the capacitor battery via two power lines respectively, whereby the disc-type dynamic motors directly to driving the vehicle travelling at high-speed and high torque via the wheels. Accordingly, the energy efficient vehicle does not include transmission devices, such as the clutch, the transmission, the power transmission shaft, and the differential. The power produced by the generator is directly provided to the disc-type dynamic motors to drive is the vehicle travelling and is enough to drive the disc-type dynamic motors, so the vehicle does not need to stop for charging.

5 Claims, 6 Drawing Sheets

DISC-TYPE DYNAMIC MOTOR

CROSS REFERENCE TO RELATED APPLICATION

This application claims the benefits from U.S. patent application Ser. No. 14/613,474, filed on 4 Feb. 2015 and U.S. Provisional Application No. 61/966,195, filHed on Feb. 18, 2014, the subject matter of which is incorporated herein by reference.

BACKGROUND OF THE INVENTION

Field of the Invention

The present invention relates an energy efficient vehicle and a disc-type dynamic motor thereof. More particularly, an energy efficient vehicle and a disc-type dynamic motor thereof with low manufacture cost could save energy efficiently, achieving the effect that the vehicle does not need to stop for charging.

Description of Related Art

Please refer to FIG. 5, which shows a perspective view of an existing vehicle of the prior art. An engine driven vehicle 7 comprises a big-scale gasoline engine 71, a clutch 72, a transmission 73, a power transmission shaft 74, and a right and a left differential 75. The total weight of the foregoing components is more than thousand pounds. In addition, the hybrid vehicle uses gasoline and electricity as power, so besides comprises the foregoing components, further comprises the traditional electric motor 76 and sixty to eighty DC storage batteries (12V 100 Amp) 77. Furthermore, the hybrid vehicle is more expensive than the engine driven vehicle. The electric vehicle also comprises all the foregoing components except gasoline engine 71, and the power is transported to the wheels by the foregoing components. Moreover, the electric vehicle comprises much more storage batteries, so that the total weight is heavier. The vehicle weight is heavier; the fuel and electric consumption is more. Please refer to FIG. 6, which shows a perspective view of an existing cylindrical-type motor assembled in the hybrid vehicle or in the electric vehicle. The cylindrical-type motor comprises a central rotation shaft 761, a cylindrical-type rotor with induction coils 762 covered by two permanent magnets 763. Because the cylindrical-type motor 76 only has two permanent magnets 763 and the radius of torsion of the cylindrical-type motor 76 is small, the horsepower generation is limited. In order to increase horsepower, the more power is produced via the more electricity consumption so as to cause the bad endurance.

SUMMARY OF THE INVENTION

Therefore, the object of the present invention is to provide an energy efficient vehicle and a disk-type dynamic motor thereof with low manufacture cost, which can save energy efficiently, achieving the effect that the vehicle does not need to stop for charging.

For the above object, an energy efficient vehicle is disclosed, comprising a vehicle body, several wheels, a power supply unit, at least two first disc-type dynamic motors and two first power lines. The wheels are coupled to the front side and the rear side of the body. The power supply unit is assembled in the body. The two first disc-type dynamic motors are respectively assembled with two of the wheels both coupled to the front side or the rear side of the body. The one ends of the two first power lines are connected with the power supply unit and the other ends of the two first power lines are connected with the two first disc-type dynamic motors respectively.

The other object of the present invention is to provide a disk-type dynamic motor, which is energy efficient and can provide more than triple torque and horsepower, comparison with the cylindrical-type motor assembled in the existing hybrid vehicle or electric vehicle.

For the above object, a disk-type dynamic motor is disclosed, comprising a shaft, an oblate permanent magnet rotor, and an oblate stator induction coil assembly. The shaft has a first end and a second end. The oblate permanent magnet rotor comprises a rotor base and at least three permanent magnets. The central of the rotor base is mounted on the shaft, and the three permanent magnets are mounted on one surface of the rotor base along the periphery of the rotor base. The oblate stator induction coil assembly is corresponded to the oblate permanent magnet rotor and comprises a stator base and at least three induction coils. The first end of the shaft is through the central of stator base, and the three induction coils are mounted on one surface of the stator base along the periphery of the stator base and corresponded to the permanent magnets.

DETAILED DESCRIPTION OF THE PREFERRED EMBODIMENT

Figure 1:
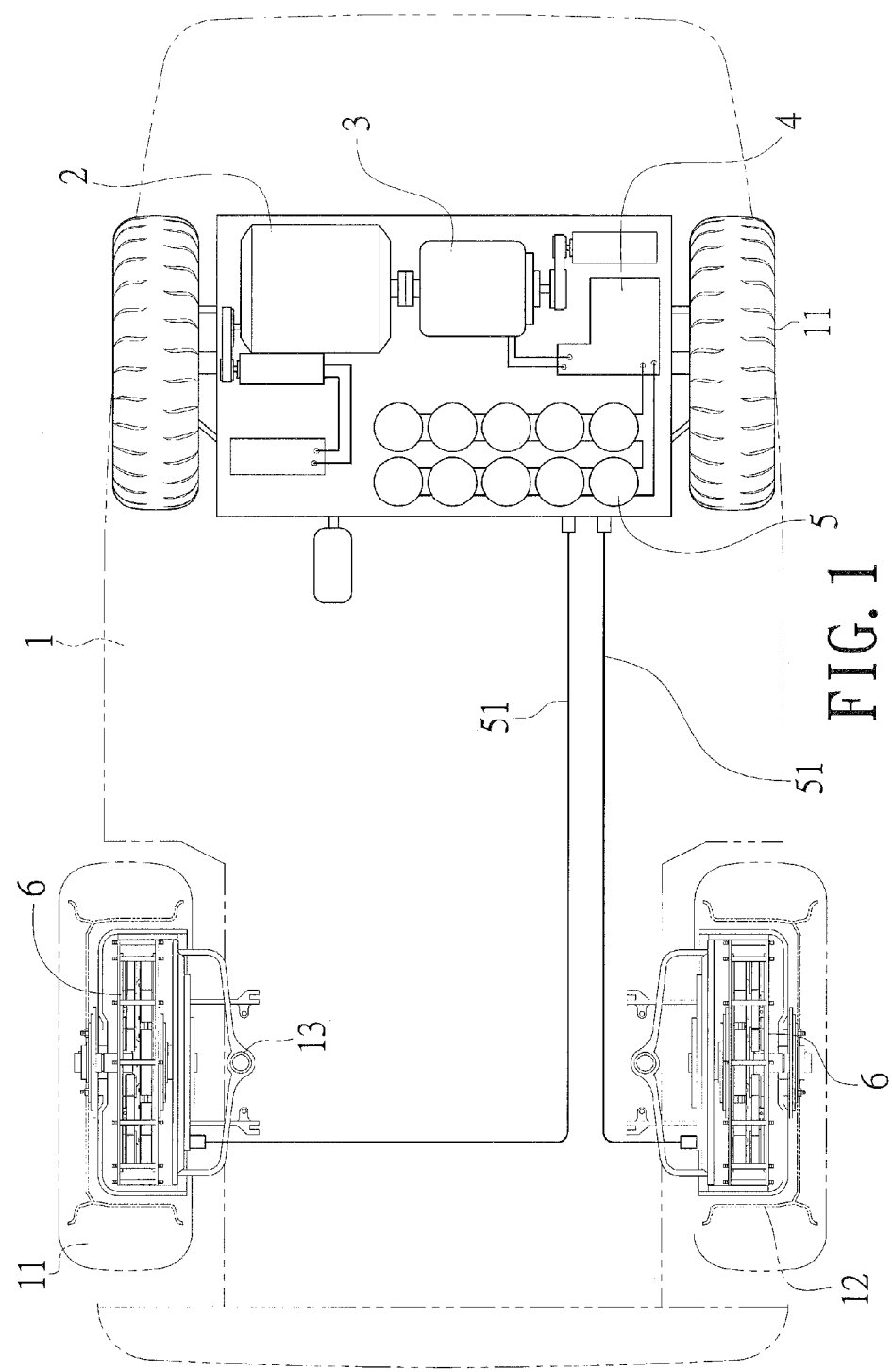
FIG. 1 is a perspective view of an energy efficient vehicle according to the embodiment of the present invention.

First, please refer to FIG. 1, which is a perspective view of an energy efficient vehicle according to the embodiment of the present invention. The energy efficient vehicle comprises a vehicle body 1, a high-speed gasoline engine 2, a high efficient generator 3, a circuit control system 4, a capacitor battery 5, and two disk-type dynamic motors 6. Several wheels are assembled at the front side and the rear side of the vehicle body 1. The gasoline engine 2 and the generator 3 are assembled vehicle in the body 1 and connected with each other. The volume of the gasoline engine 2 is a quarter of that of the same type engine, and the rotation speed of the gasoline engine 2 is about 4000 to 6800 rpm. The gasoline engine 2 drives the generator 3, and the generator 3 can generate DC power with high voltage (480V) and high current. The circuit control system 4 and the capacitor battery 5 are also assembled in the vehicle body 1. The circuit control system 4 is connected with the generator 3 and the capacitor battery 5, and the capacitor battery 5 is connected with one ends of two power lines 51. The two disk-type dynamic motors 6 are respectively assembled with two of the wheels both coupled to the rear side of the vehicle body, and the other ends of the two power lines 51 are connected with the two disk-type dynamic motors 6 respectively.

Figure 2:
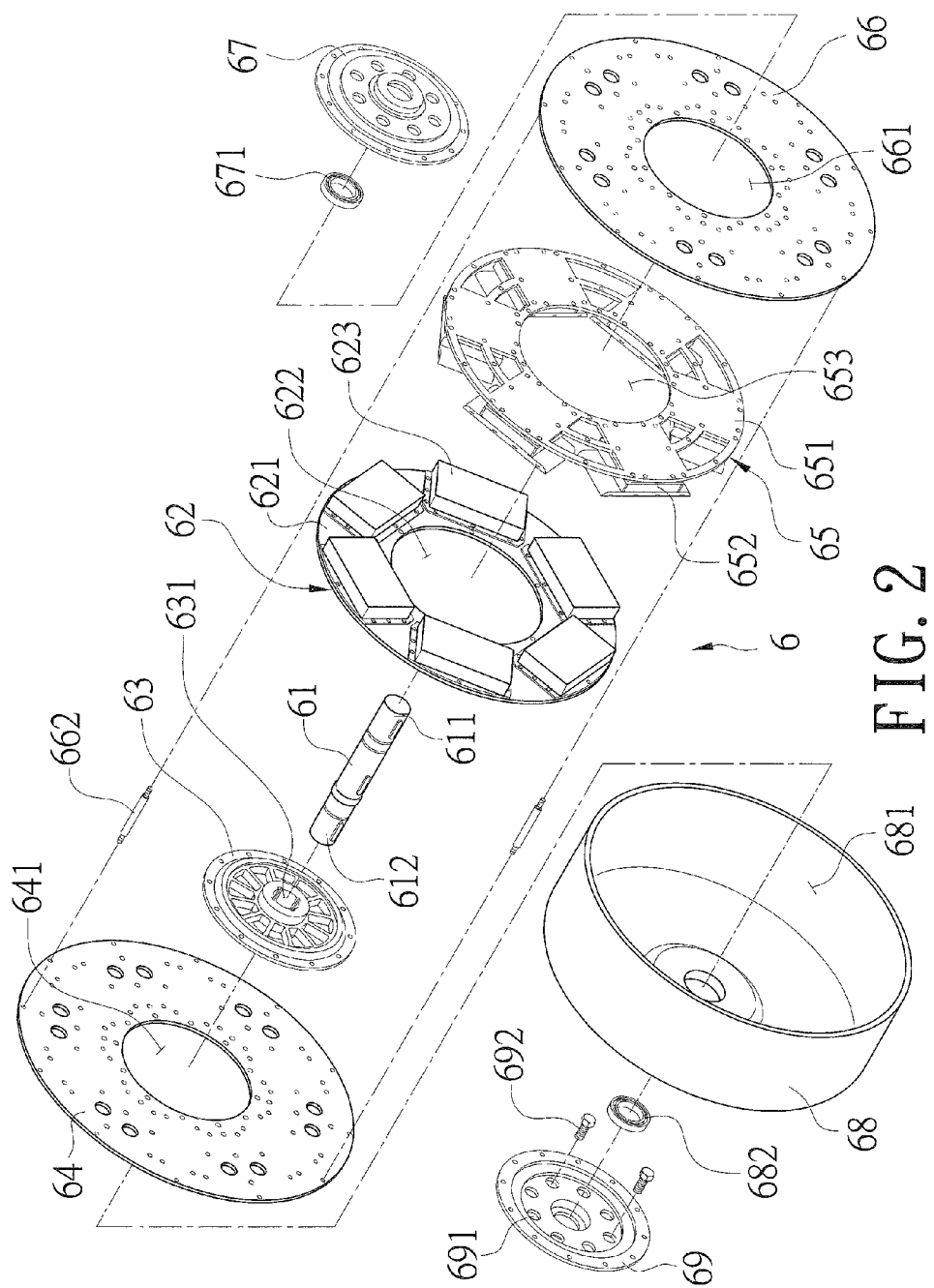
FIG. 2 is a three-dimensional exploded view of a disk-type dynamic motor according to the embodiment of the present invention.
Figure 3:
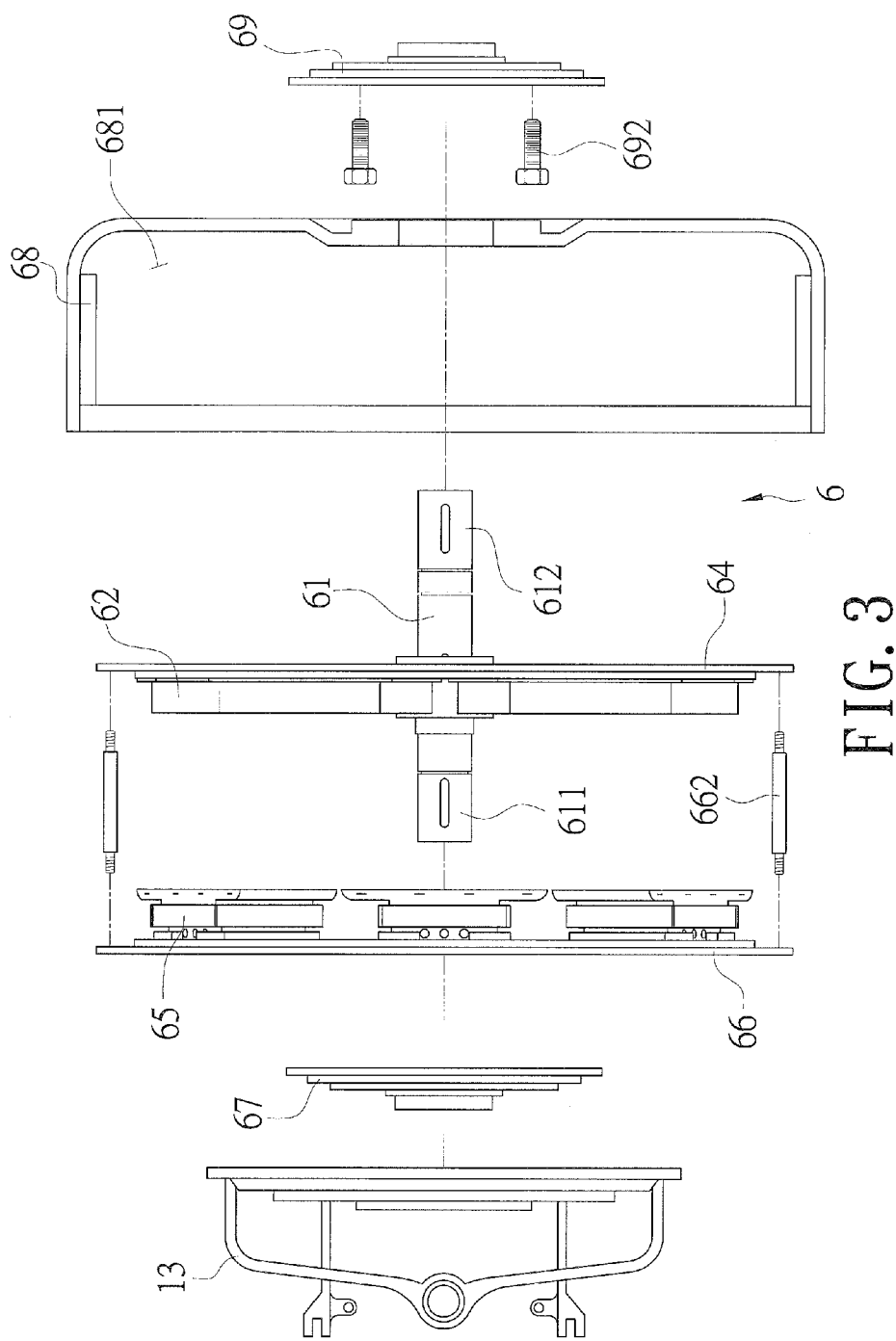
FIG. 3 is a side exploded view of a disk-type dynamic motor according to the embodiment of the present invention.
Figure 4:
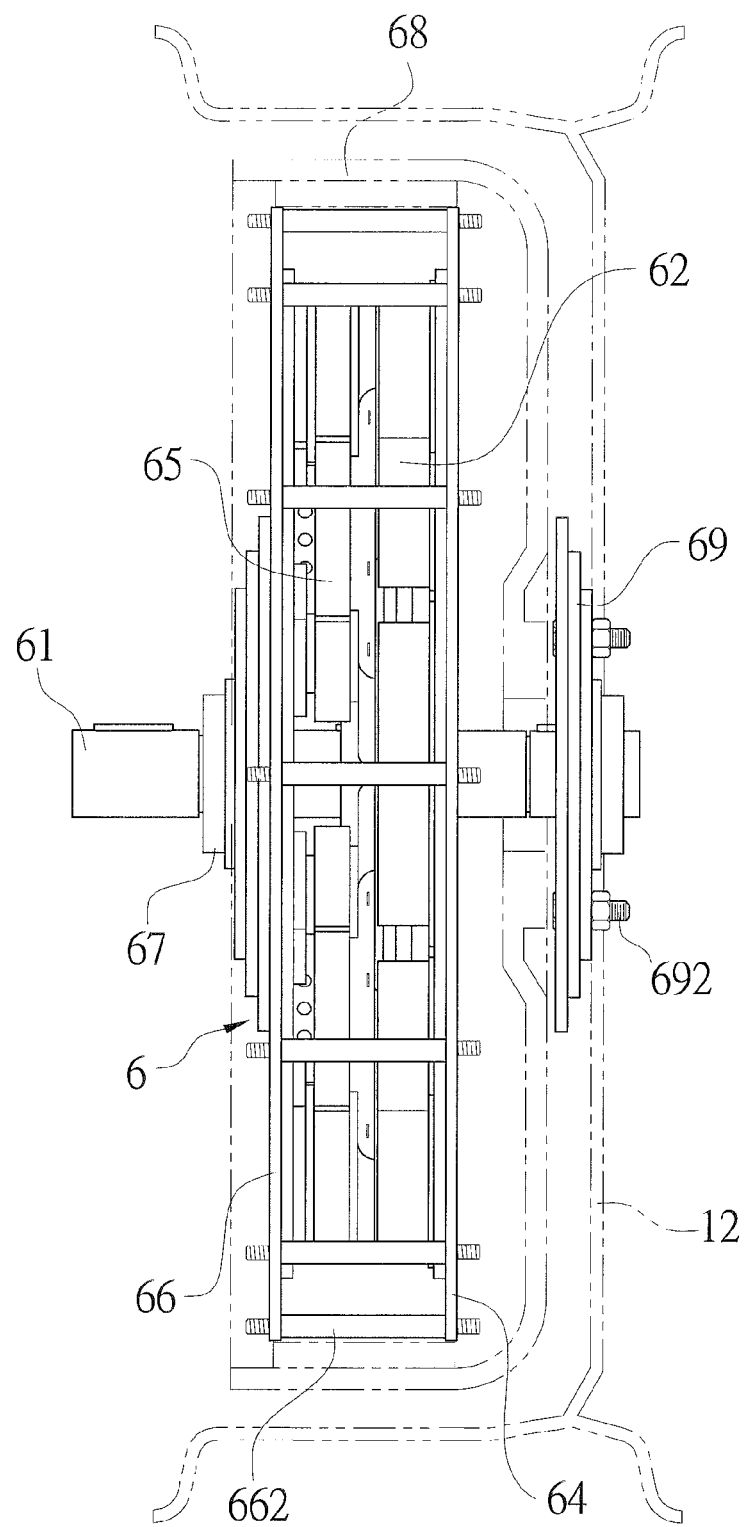
FIG. 4 is a side view of a disk-type dynamic motor according to the embodiment of the present invention.
Figure 5:
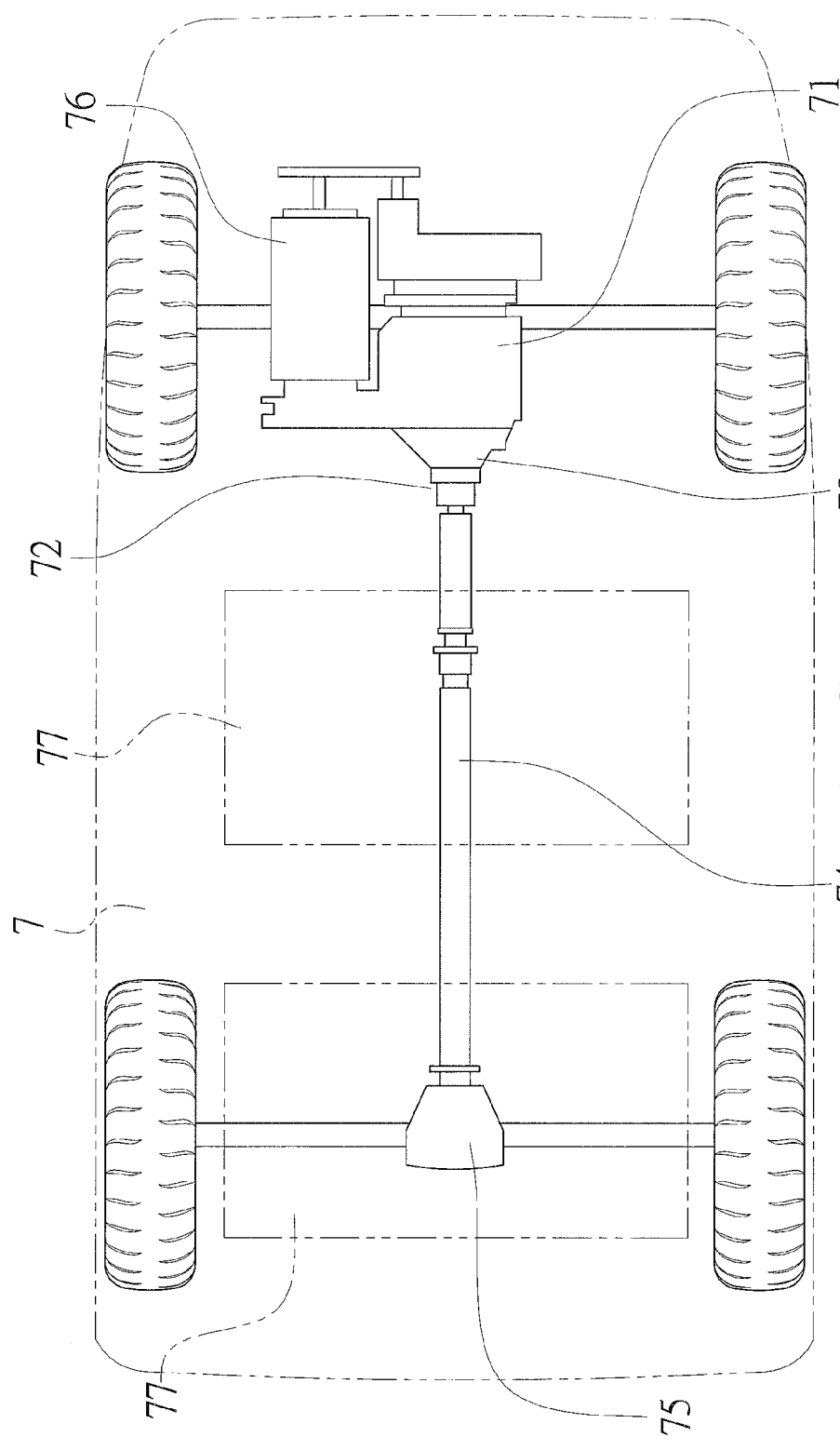
FIG. 5 is a perspective view of an existing vehicle of the prior art.

Please refer to FIG. 2 to FIG. 4, which are a three-dimensional exploded view, a side exploded view and a side view of a disk-type dynamic motor according to the embodiment of the present invention. The disc-type dynamic motor 6 comprises a shaft 61, an oblate permanent magnet rotor 62, a shaft fixing disc 63, a first assembly disk 64, an oblate stator induction coil assembly 65, a second assembly disk 66, a bottom lid 67, a motor shell 68, and at least two horsepower output disks 69. The shaft 61 has a first end 611 and a second end 612. The shaft 61 is through a central opening 622 at the central of an oblate rotor base 621 of the oblate permanent magnet rotor 62 and then is positioned in a securing hole 631 of the shaft fixing disc 63 which is fastened to one surface of the oblate rotor base 621. The first assembly disc 64 faces and not fastened to the surface of the oblate rotor base 621, which surface of the oblate rotor base is fastened to the shaft fixing disc 63. At least three permanent magnets 623 are mounted on the other surface of the oblate rotor base 621 along the periphery of the oblate rotor base 621. According to an embodiment, the oblate permanent magnet rotor 62 comprises six permanent magnets 623. The oblate stator induction coil assembly 65 is corresponding to the oblate permanent magnet rotor 62. At least three induction coils 652 are mounted on one surface of an oblate stator base 651 of oblate stator induction coil assembly 65 along the periphery of the oblate stator base 651 and corresponded to the permanent magnets 623. According to an embodiment, the oblate stator induction coil assembly 65 comprises six induction coils 652. The central of the oblate stator base 651 has an opening 653 for the first end 611 of the shaft 61 through. One surface of the second assembly disc 66 is fastened to the other surface of the oblate stator base 651, which surface is different from that the induction coils 652 mounted on. And the other surface of the second assembly disc 66 is fastened with the bottom lid 67. The first end 611 of the shaft 61 through from the oblate stator base 651 is then through a through-hole 661 at the central of the second assembly disc 66 and then connected with a bearing 671 of the bottom lid 67, so as to fix the bottom lid 67 with a suspension hold 13 of the vehicle body 1. Several fasteners 662 are between the first assembly disc 64 and the second assembly disc 66 for fastening the two discs together along periphery of the two discs. The motor shell 68 has a space 681 for the oblate permanent magnet rotor 62, the oblate stator induction coil assembly 65, the shaft fixing disc 63, the first assembly disc 64, and the second assembly disc 66. The central of the motor shell 68 has a bearing 682 and the bearing 682 is connected with the second end 612 of the shaft 61 which is through from the shaft fixing disc 63 and then through a through-hole 641 at the central of the first assembly disc 64. The horsepower output disks 69 are fastened to hubs 12 of the rear wheels 11 of the vehicle body 1 and the central bearing of each horsepower output disk 69 is assembled with the second end 612 of the shaft 61 which is through from the motor shell 68. The periphery of the central of the horsepower output disk 69 has several locking holes 691 for inserting fasteners 692 such as screws to fasten the horsepower output disk 69 to the hub 12 of the wheels 11.

Accordingly, when a user drives the energy efficient vehicle of the present invention, the small-scale high-speed gasoline engine 2 is started to drive the high efficient generator 3 to generate power. Then, the power is transported to the capacitor battery 5 via the circuit control system 4 and transported to the oblate stator induction coil assembly 65 of the disk-type dynamic motors 6 assembled at the rear wheels of the vehicle body 1 by the two power lines 51 respectively for producing a current. The current is passed through the induction coils 652 to produce a rotating magnetic field between the induction coils 652 and the permanent magnets 623 of the oblate permanent magnet rotor 62, so as to drive the oblate permanent magnet rotor 62 rotating. At this time, the shaft 61 in the central of the oblate permanent magnet rotor 62 is also rotated to drive the horsepower output disk 69 rotating, which horsepower output disk 69 is connected to the second end 612 of the shaft 61, and the wheels 11 fastened with the horsepower output disk 69 are driven by the horsepower output disk 69 and are rotated simultaneously, so the energy efficient vehicle of the present invention could travel under high speed and high torque.

Furthermore, the energy efficient vehicle of the present invention does not include the big-scale gasoline engine, the clutch, the transmission, the power transmission shaft, the differential, and the storage battery, so the manufacture cost is saved, the space of the vehicle is increased, and the weight of the vehicle is decreased, achieving the effect of fuel efficient and electricity efficient. The manufacture cost of the energy efficient vehicle of the present invention is 25% lower than the gasoline vehicle, is 45% lower than the hybrid vehicle, and is 50% lower than the electric vehicle. The weight of the energy efficient vehicle of the present invention is decreased more than 50%, compared with the gasoline vehicle, the hybrid vehicle, and the electric vehicle. Moreover, compared with the gasoline vehicle and the hybrid vehicle, the fuel consumption of the energy efficient vehicle of the present invention is saved more than 50%, and the pollution produced by the energy efficient vehicle is decreased more than 50%. In addition, the energy efficient vehicle of the present invention does not include the clutch and the transmission etc., so that the defective rate and the cost of repairing are decreased.

Figure 6:
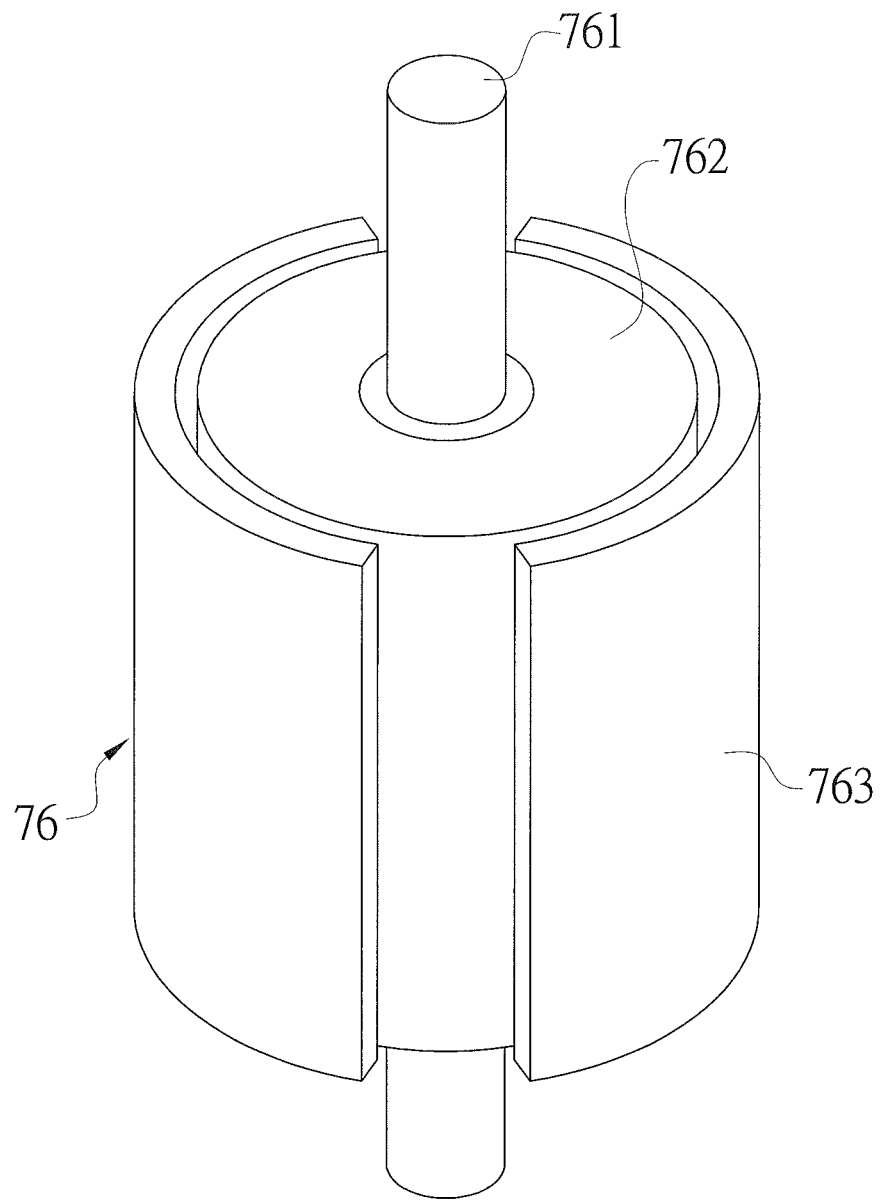
FIG. 6 is a perspective view of an existing cylindrical-type motor of the prior art.

Please refer to FIG. 6. The radius of torsion of the oblate permanent magnet rotor 62 of the disk-type dynamic motor 6 is more than three times of the radius of the cylindrical motor 76 assembled in the hybrid vehicle and the electric vehicle, and the amount of the permanent magnets 623 assembled on the oblate permanent magnet rotor 62 is also more than three times of the amount of the permanent magnets 763 of the cylindrical motor 76. Therefore, when the same voltage and the same current are provided to the disk-type dynamic motor 6 of the present invention and the cylindrical motor 76, the disk-type dynamic motor 6 of the present invention produces more than three times torque and horsepower, compared with the cylindrical motor 76, so that the energy efficient vehicle of the present invention saves electricity not need to stop for charging The foregoing embodiments and drawings do not limit the energy efficient vehicle of the present invention. According to the necessary, the disk-type dynamic motors 6 can be assembled at the rear wheels 11 of the vehicle body 1 or at the front wheels 11 of the vehicle body 1 in the two-wheel drive vehicle. Or, the disk-type dynamic motors 6 can be assembled at the rear wheels 11 and at the front wheels 11 of the vehicle body 1, and four power lines 51 connected with the capacitor battery 5 is connected to the disk-type dynamic motors 6 at the front side and the rear side of the vehicle body 1 respectively for the four-wheel drive vehicle such as a country car or a tank. Moreover, a general storage battery can be substituted for the gasoline engine 2, the generator 3, the circuit control system 4, and the capacitor battery 5 in the energy efficient vehicle of the present invention, so a power supply unit comprising several storage batteries is connected with the power line to provide power to the disk-type dynamic motor 6. Therefore, when the energy efficient vehicle of the present invention is an electric vehicle, the electricity consumption of the energy efficient vehicle is half of the electricity consumption of the general electric car, and the endurance of the energy efficient vehicle can be increased more than 30%.

What is claimed is:

1. A disc-type dynamic motor, comprising:
a shaft, having a first end and a second end;
a disc shaped permanent magnet rotor, including:
   a shaft fixing disc having a securing hole at a central portion thereof
   a rotor base having a disc shape and first and second opposing surfaces, the rotor base having a central opening and the shaft fixing disc being fastened to the first surface of the rotor base with the shaft passing through the central opening and being positioned in the securing hole of the shaft fixing disc; and
   at least three permanent magnets mounted on the second surface of the rotor base along a periphery thereof;
a first assembly disc disposed adjacent to the first surface of the rotor base, a central portion of the first assembly disc having a through-hole and the second end of the shaft extends therethrough;
a disc shaped stator induction coil assembly corresponding to the permanent magnet rotor, the stator induction coil assembly including:
   a stator base having a disc shape and first and second opposing surfaces, the stator base having a central opening and the first end of the shaft passes therethrough; and
   at least three induction coils mounted on the first surface of the stator base along a periphery thereof in correspondence to the permanent magnets;
a second assembly disc fastened to the second surface of the stator base, a central portion of the second assembly disc having a through-hole and the first end of the shaft extends therethrough; and
a plurality of fasteners extending between a periphery of the first assembly disc and a periphery of the second assembly disc and fastening one to the other.

2. The disc-type dynamic motor according to claim 1, further comprising:
a motor shell, having a space for the disc shaped permanent magnet rotor, the disc shaped stator induction coil assembly, the first assembly disc, and the second assembly disc, wherein the second end of the shaft extending through the through-hole of the first assembly disc extends through a central portion of the motor shell; and
a bottom lid, fastened with the second assembly disc and opposite the stator base, wherein the first end of the shaft extending through the through-hole of the second assembly disc is connected with a central portion of the bottom lid.

3. The disc-type dynamic motor according to claim 2, further comprising:
a horsepower output disc, a central portion of the horsepower output disc being connected with the second end of the shaft extending through the central portion of the motor shell.

4. The disc-type dynamic motor according to claim 1, further comprising:
a motor shell, having a space for the disc shaped permanent magnet rotor and the disc shaped stator induction coil assembly, wherein the second end of the shaft extends through a central portion of the motor shell; and
a bottom lid, a central portion of the bottom lid being connected with the first end of the shaft extending through the stator base.

5. The disc-type dynamic motor according to claim 4, further comprising:
a horsepower output disc, a central of the horsepower output disc being connected with the second end of the shaft extending through the central portion of the motor shell.

\* \* \* \* \*